(12) United States Patent　　(10) Patent No.:　US 12,633,120 B2
Ellis et al.　　(45) Date of Patent:　May 19, 2026

(54) SYSTEMS AND METHODS FOR PIRACY DETECTION AND PREVENTION

(71) Applicant: NAGRASTAR, LLC, Englewood, CO (US)

(72) Inventors: Benjamin Brian Ellis, Englewood, CO (US); Diego Gonzalez, Englewood, CO (US)

(73) Assignee: NAGRASTAR, LLC, Englewood, CO (US)

( * ) Notice: Subject to any disclaimer, the term of this patent is extended or adjusted under 35 U.S.C. 154(b) by 159 days.

(21) Appl. No.: 17/627,632

(22) PCT Filed: Jul. 17, 2019

(86) PCT No.: PCT/US2019/042271
§ 371 (c)(1),
(2) Date: Jan. 14, 2022

(87) PCT Pub. No.: WO2021/010999
PCT Pub. Date: Jan. 21, 2021

(65) Prior Publication Data
US 2022/0358762 A1　Nov. 10, 2022

(51) Int. Cl.
*G06V 20/40*　(2022.01)
*G06F 21/10*　(2013.01)
*G06V 10/70*　(2022.01)

(52) U.S. Cl.
CPC .............. *G06V 20/41* (2022.01); *G06V 10/70* (2022.01); *G06V 20/46* (2022.01); *G06V 20/48* (2022.01); *G06F 21/1078* (2023.08)

(58) Field of Classification Search
CPC .......... G06N 20/00; G06N 3/08; G06N 20/20; G06N 3/02; G06F 21/10; G06F 16/2458;
(Continued)

(56) References Cited

U.S. PATENT DOCUMENTS 8,601,596 B2 * 12/2013 Wu ......................... G06F 21/10
726/1
10,467,526 B1 * 11/2019 Appalaraju .......... G06V 10/774
(Continued)

OTHER PUBLICATIONS

Stolikj et al. (2018) "Artificial Intelligence for Detecting Media Piracy" SMPTE Motion Imaging Journal, vol. 127, No. 6, pp. 22-27.
(Continued)

*Primary Examiner* — Techane Gergiso

(57) ABSTRACT

Examples of the present disclosure describe systems and methods for detecting and preventing digital media piracy. In example aspects, a machine learning model is trained on a dataset related to digital media content. Input data may then be collected by a data collection engine and provided to a multimedia processor. The multimedia processor may extract multimedia features (e.g., audio, visual, etc.) and recognized patterns from the input data and provide the extracted multimedia features to a trained machine learning model. The trained machine learning model may compare the extracted features to the model, and a confidence value may be generated. The confidence value may be compared to a confidence threshold. If the confidence value is equal to or exceeds the confidence threshold, then the input data may be classified as pirated digital media. Remedial action response(s) may subsequently be deployed to thwart the piracy of the digital media.

20 Claims, 7 Drawing Sheets

(58) Field of Classification Search

CPC .... G06F 21/1078; G06V 20/41; G06V 20/46; G06V 10/70; G06V 20/48

See application file for complete search history.

(56) References Cited

U.S. PATENT DOCUMENTS

| | | | | |
|---|---|---|---|---|
| 10,504,504 | B1 * | 12/2019 | Meltzner | G10L 25/27 |
| 10,834,158 | B1 * | 11/2020 | Bourgoyne | G06F 21/1083 |
| 10,956,484 | B1 * | 3/2021 | Kulkarni | G10L 15/10 |
| 11,004,080 | B2 * | 5/2021 | Edwards | H04W 12/12 |
| 11,023,757 | B2 * | 6/2021 | Park | G06V 40/168 |
| 11,076,180 | B2 * | 7/2021 | Shah | H04N 21/8358 |
| 11,100,593 | B2 * | 8/2021 | Ayachitula | G06Q 30/0207 |
| 11,176,452 | B2 * | 11/2021 | Porat | G06N 3/042 |
| 11,227,047 | B1 * | 1/2022 | Vashisht | G06N 20/00 |
| 11,645,249 | B1 * | 5/2023 | Mahyar | G06V 10/762 |
| | | | | 707/692 |
| 2003/0004966 | A1 * | 1/2003 | Bolle | G06F 16/5846 |
| | | | | 707/E17.103 |
| 2003/0033347 | A1 * | 2/2003 | Bolle | G06F 16/786 |
| | | | | 707/E17.022 |
| 2012/0240236 | A1 * | 9/2012 | Wyatt | G06F 21/564 |
| | | | | 726/25 |
| 2013/0152211 | A1 * | 6/2013 | Wu | G06F 21/10 |
| | | | | 709/204 |
| 2014/0245463 | A1 * | 8/2014 | Suryanarayanan | G06F 21/10 |
| | | | | 726/28 |
| 2017/0063911 | A1 * | 3/2017 | Muddu | G06F 40/134 |
| 2018/0018590 | A1 * | 1/2018 | Szeto | G16H 50/20 |
| 2018/0192101 | A1 * | 7/2018 | Bilobrov | G06F 16/907 |
| 2018/0247054 | A1 * | 8/2018 | Porat | G06F 21/10 |
| 2018/0285984 | A1 * | 10/2018 | Ayachitula | G06N 7/01 |
| 2018/0376185 | A1 * | 12/2018 | Lonstein | H04N 21/4788 |
| 2019/0064752 | A1 * | 2/2019 | Marwah | G05B 13/028 |
| 2019/0205467 | A1 * | 7/2019 | Wold | G06F 16/683 |
| 2019/0304156 | A1 * | 10/2019 | Amer | G06F 18/22 |
| 2019/0370218 | A1 * | 12/2019 | Di Pietro | G06N 20/00 |
| 2020/0110853 | A1 * | 4/2020 | Tooley | H04L 63/1408 |
| 2020/0134368 | A1 * | 4/2020 | Chopra | G01C 23/005 |
| 2020/0160229 | A1 * | 5/2020 | Atcheson | G06N 20/00 |
| 2020/0322658 | A1 * | 10/2020 | Shah | H04N 21/8358 |
| 2020/0382573 | A1 * | 12/2020 | Trim | H04L 65/762 |
| 2020/0413113 | A1 * | 12/2020 | Tofighbakhsh | H04N 21/25891 |
| 2021/0117480 | A1 * | 4/2021 | Deen | G06V 10/82 |

OTHER PUBLICATIONS

Carlos Toxtli (2018) "Deepiracy: Video piracy detection system by using Longest Common Subsequence and Deep Learning" [online] Accessed on Mar. 23, 2020, website: https://medium.com/hci-wvu/piracy-detection-using-longest-ommon-subsequence-and-neural-networks-a6f689a541a6.

Wu et al. (2003) "Multimedia web services for content filtering, searching, and digital rights management" Information, Communications and Signal Processing, 2003 and Fourth Pacific Rim Conference on Multimedia. Proceedings of the 2003 Joint Conference of the Fourth International Conference on Singapore Dec. 15-18, 2003, Piscataway, NJ, USA, IEEE, vol. 1, Dec. 15, 2003. pp. 191-196.

Prieto et al. (2018) "A supervised learning approach to detect copyright infrigments" 2018 International Conference on Information Management and Processing, (ICIMP). IEEE, Jan. 12, 2018 (Jan. 12, 2018), pp. 100-106.

International Application No. PCT/US2019/042271, International Search Report and Written Opinion mailed Mar. 30, 2020, 10 pages.

\* cited by examiner

300

400

Start

Receive collected data

402

Classify collected data

404

Identify features and/or objects in collected data

406

Aggregate features/objects

408

End     410

1

SYSTEMS AND METHODS FOR PIRACY DETECTION AND PREVENTION

BACKGROUND

Digital piracy is the unauthorized use of copyrighted content. Current techniques of detecting and remediating digital piracy are unreliable and cumbersome to implement. As the volume of digital media continues to grow, implementing current "matching" techniques for detecting digital piracy becomes more time-consuming. Current techniques of detecting and remediating digital piracy are also deficient with regard to live broadcasts and streaming media, as the lag between detecting piracy and the live media decreases the ability to detect and thwart the pirated digital media in real-time. As a result, digital piracy continues to spread uninhibited.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods for detecting pirated digital media. In aspects, multimedia features of a digital media item are identified. A pattern recognizer is trained using at least one machine learning model. The at least one machine learning model utilizes identified multimedia features to detect the identified multimedia features in other digital media items. A candidate digital media item may be provided to the piracy detection system. The multimedia features of the candidate digital media item may be compared against the machine learning model of the pattern recognizer. A confidence value may be generated based on the comparison of the multimedia features of the candidate digital media item with the machine learning model. In at least one aspect, the machine learning model may use pattern recognition to identify multimedia features. The recognized patterns may be compared to the candidate digital media item to determine if the candidate digital media item is pirated multimedia. In another aspect, the confidence value indicates the confidence that the multimedia features of the candidate digital media item are similar to the identified multimedia features from the machine learning model. The confidence value may be compared to a confidence threshold, where the confidence threshold is a benchmark indicating that the candidate digital media item may be pirated. If the confidence value exceeds the confidence threshold, remedial action may be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
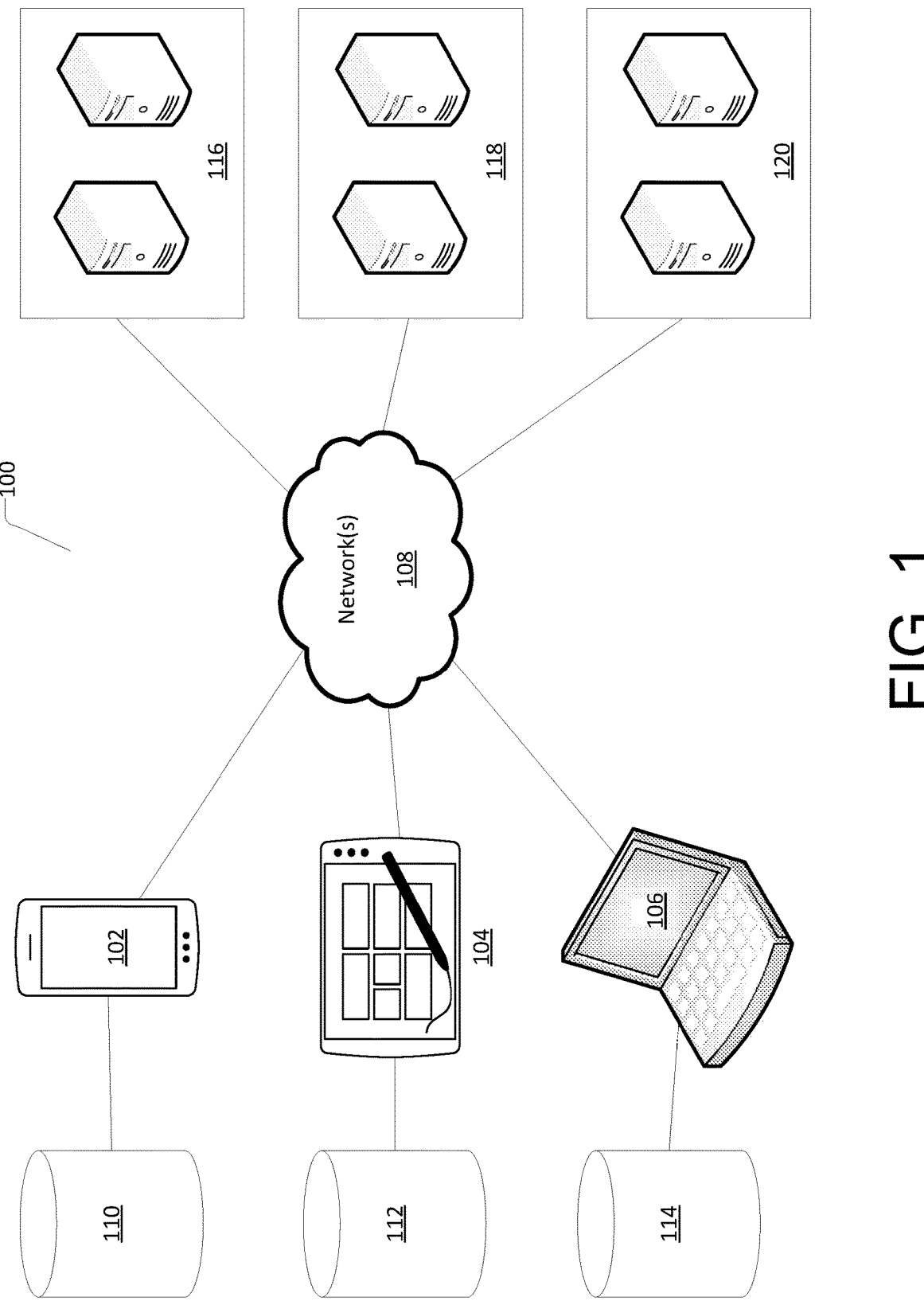
FIG. 1 illustrates an example of a distributed system for detecting and remediating digital piracy.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Digital piracy is the unauthorized use of copyrighted content. According to a recent report, the cost of online piracy is expected to hit $52 billion by the year 2022. Currently, "fingerprinting" and "watermarking" techniques are used by content owners and content providers to detect digital piracy. "Watermarking" is a technique of placing a logo or other identifying mark on digital media. "Fingerprinting" is a method of reducing a digital file to a mathematical representation and comparing the representation of the digital file to an external database comprising representations of digital files. If the digital files (or representations thereof) match, the file may be pirated. However, such fingerprinting and watermarking techniques are unreliable and cumbersome to implement. For instance, creating an external database of "fingerprints" of an old television show requires the content owner to provide potentially hundreds of episodes of that show to be fingerprinted. Furthermore, using fingerprinting techniques to detect digital piracy in streaming media or a live broadcast is difficult because streaming media and live broadcasts occur in real-time. Fingerprinting cannot be employed in real-time with new digital content because fingerprinting requires that the digital content already be stored in an external database. Also, when pirated content has been slightly modified through techniques such as cropping, mirroring, luminance adjustment, etc., techniques like "fingerprinting" or "watermarking" may no longer be effective because the fingerprint or watermark may be altered, obstructed, or removed.

With the above-described shortcomings of conventional piracy detection techniques in mind, the present disclosure describes systems and methods for implementing a machine-learning based digital piracy detection system. In aspects, the digital piracy detection system includes a pattern recognizer that implements at least one machine learning model. The pattern recognizer includes at least two modes: a training mode and a processing mode. During training mode, at least one machine-learning model within the pattern recognizer may be trained on various digital media items. After the machine learning model(s) are trained, the pattern recognizer may be placed into (or configured to operate in) a processing mode. During processing mode, multimedia features of various digital media items may be extracted and identified by the pattern recognizer. The identified and extracted features may then be provided to the trained machine-learning model(s). As one example, during training mode, one or more entities may identify one or more audio features and/or visual features from a media file. Identification of the audio/visual features may be a manual process (e.g., performed by an administrator, a system operator, etc.) or an automatic process (e.g., performed using a feature selection algorithm or model). The identified audio/visual features may be organized into one or more groups and/or extracted from the media file. The extracted features may be used to train one or more machine-learning model(s) of the pattern recognizer to identify features of (or patterns in) the media file and/or content associated therewith. After a machine-learning model is trained, during processing mode, candidate digital media items may be obtained and compared against the machine-learning model. Based on the comparison, the pattern recognizer may produce a confidence value for the candidate digital items. If the confidence value exceeds a confidence threshold, the candidate digital item may be determined to be pirated content, and remedial action may be deployed.

The techniques disclosed herein increase the speed of detecting and remediating pirated digital content as compared to traditional methods of fingerprinting, watermarking, and other one-to-one matching techniques. The increased speed of detection and remediation of pirated digital media is attributed to the use of a pattern recognizer comprising (or otherwise associated with) at least one machine-learning model and a confidence threshold. Rather than require an exact match between a fingerprint of a candidate digital media item and a stored fingerprint of a source digital media item, the disclosed machine-learning based piracy detection system can detect pirated media based on recognized patterns and a confidence threshold without requiring an exact match of the media items. For example, the pattern recognizer (or a machine-learning model associated therewith) may be trained on a digital media item from a popular television show. The digital media item may be an older episode of the popular television show. Various visual features (e.g., backdrop, character faces, etc.) of the older episode may be provided to the pattern recognizer. Based on the provided visual features, the pattern recognizer may be trained to recognize patterns and objects of the popular television show. When a new episode of the popular television show is released, currently available techniques will require that the new episode be fingerprinted or watermarked before identifying future pirated copies of the new episode. Conversely, the machine-learning based piracy detection system disclosed herein is able to identify pirated copies of the new episode immediately, even though the machine-learning model may not have been trained on that particular new episode. The piracy detection system is able to detect the pirated material by comparing the visual features (e.g., backdrop, character faces, etc.) of the new episode with the visual features and patterns identified in the older episode on which the machine-learning model was trained. Based on the comparison, the piracy detection system will determine if the multimedia features of the new episode exceed a confidence threshold. If the threshold is exceeded, digital piracy may be detected and thwarted through remedial action.

Accordingly, the present disclosure provides a plurality of technical benefits including but not limited to: enabling more accurate and frequent detection of pirated content while using less memory storage and technical resources; determining digital media content is pirated without manually loading the digital media content into an external database for preprocessing; identifying multimedia features and patterns of pirated content in live broadcasts and streaming media in real-time; enabling devices located remotely from each other to detect and remediate pirated content; and improving the quality of digital media content distribution by identifying and remediating digital piracy, among other examples.

FIG. 1 illustrates an example of a distributed system for detecting and remediating digital piracy. Example system 100 presented is a combination of interdependent components that interact to form an integrated whole for detection and remediation of pirated digital content. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to access digital content. In aspects, a client device, such as client devices 102, 104, and 106, may have access to one or more data sources comprising digital content. The data sources may be local to, or external to, the client device. The digital content may include, for example, video files, audio files, image files, text files, application documents, streaming content, and the like. For example, the client device may access digital content stored in a local database. As another example, the client device may execute a data streaming application or service that transmits digital content from one or more remote web servers or external data storage locations, such as server devices 116, 118, and/or 120. The streaming service may transmit digital content to the client device using network(s) 108.

In some aspects, digital content received or accessed by the client device may be provided to one or more machine-learning (ML) models of a pattern recognizer. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, a server device, a network appliance (e.g., a firewall, a router, etc.), or some combination thereof. Alternately, one or more rule sets or logic algorithms may be applied to the digital content. For example, a fuzzy logic algorithm to identify digital content characteristics and attributes (or states thereof). The ML models may process the data to determine whether the digital content is pirated content. Pirated content, as used herein, may refer to digital media that is duplicated and/or distributed through unauthorized or illegal means. Determining whether the digital content is pirated content may comprise identifying various audio and/or video features of the digital content and evaluating the identified audio and/or video features against a previously identified set of audio and/or video features. In examples, when the identified audio and/or video features are determined to exceed a similarity threshold (e.g., the identified audio and/or video features are sufficiently similar to the previously identified set of audio and/or video features), the digital content may be classified as pirated content. Based on the classification, the client device or a server device may perform (or cause the performance of) one or more actions.

In some aspects, audio and/or video features of digital content may be used to train the one or more ML models. For example, a set of labeled and/or unlabeled data may be used to train an ML model to identify digital media items that are sufficiently similar to the data used to train the model. The training may include the use of one or more supervised or unsupervised learning techniques, including but not limited to pattern recognition techniques. The trained ML model may be deployed to one or more devices. As a specific example, an instance of a trained ML model may be deployed to a server device and to a client device. The ML model deployed to sever device may be configured to be used by the client device when, for example, the client device is connected to the internet. Conversely, the ML model deployed to a client device may be configured to be used by the client device when, for example, the client device is not connected to the internet. In such an example, the ML model may be locally cached by the client device.

Figure 2:
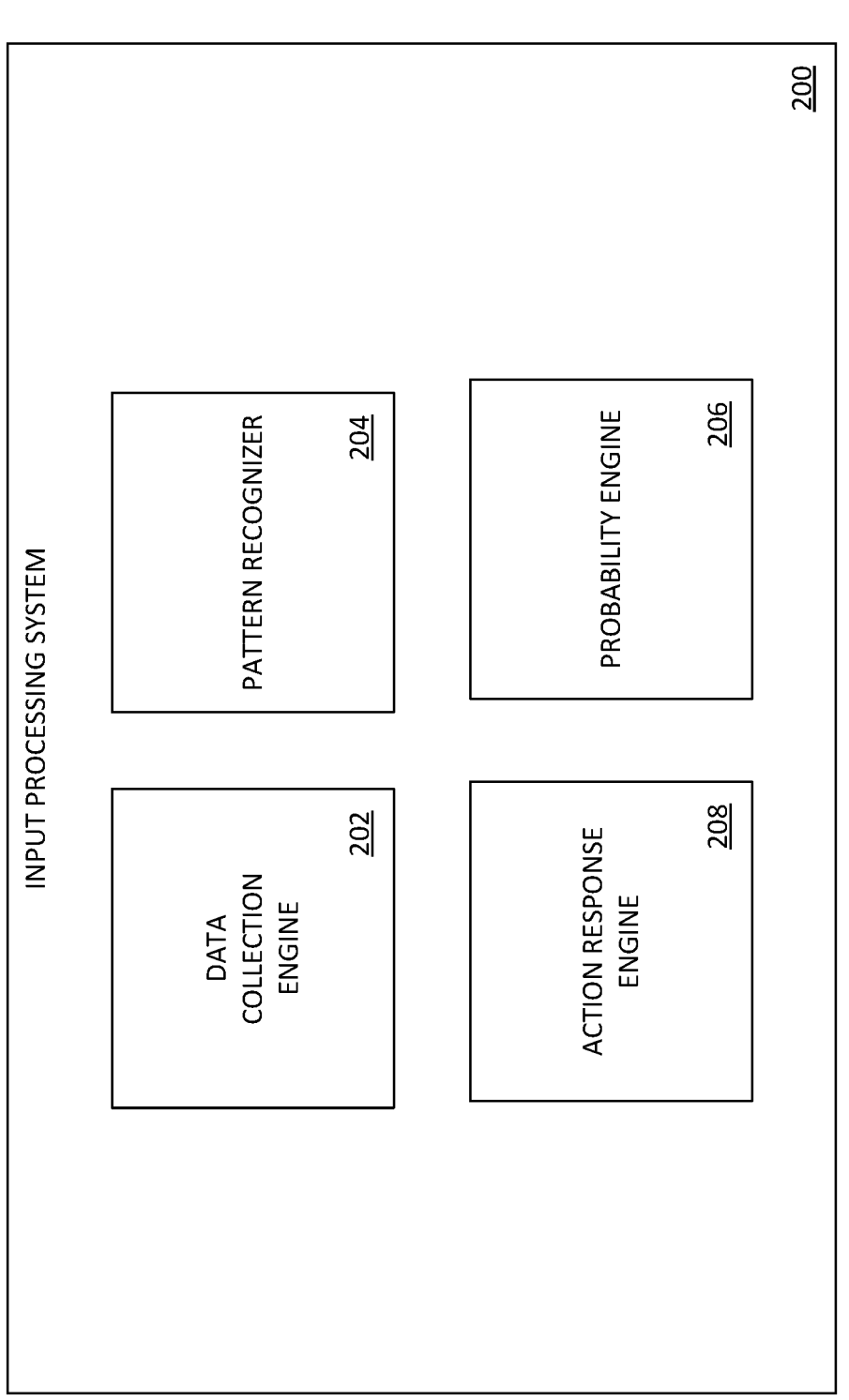
FIG. 2 illustrates an example input processing system for implementing systems and methods for digital piracy detection and remediation.

With respect to FIG. 2, input processing system 200 may represent, for example, a network operator that provides communication and input processing services to customers/ users. In aspects, input processing system 200 may comprise data collection engine 202, pattern recognizer 204, probability engine 206, and action response engine 208. One of skill in the art will appreciate that the scale of systems such as input processing system 200 may vary and may include more or fewer components than those described in FIG. 2. In some examples, interfacing between components of input processing system 200 may occur locally, such as where components of input processing system 200 are within the same device or network (e.g., WAN, LAN, peer to peer network, etc.). In other examples, interfacing between components of the input processing system 200 may occur remotely, such as where components of input processing system 200 are spread across one or more devices of one or more distributed networks.

Data collection engine 202 may be configured to collect customer, account, and/or device information, along with multimedia data information that is displayed or used on a device from one or more data sources. In aspects, input processing system 200 may detect, or otherwise be informed of, devices (e.g., customer devices, user devices, network appliance devices, etc.) that have connected to input processing system 200 or a network thereof. Input processing system 200 may collect and/or store information related to the detected/connected devices and/or the corresponding users. Data collection engine 202 may have access to the information collected/stored and may collect or aggregate at least a portion of the collected/stored information. For example, candidate digital media items may be collected and stored by the data collection engine 202. Alternately, data collection engine 202 may interrogate, or otherwise solicit data from, one or more data sources comprising such information. For example, data collection engine 202 may have access to data in one or more external systems, such as content systems, distribution systems, marketing systems, user profiles or preference settings, authentication/authorization systems, device manifests, or the like. Data collection engine 202 may use a set of APIs or similar interfaces to communicate requests to, and receive response data from, such data sources. In at least one example, the data collection process of data collection engine 202 may be triggered according to a present schedule, in response to a specific user request to collect data, or in response to the satisfaction of one or more criteria (e.g., opening and running a streaming application on a client device). Data collection engine 202 may also employ at least one web crawler, wherein the web crawler is configured to identify and collect digital media content on the Internet.

Pattern recognizer 204 may be configured to identify and extract various multimedia features and/or data objects of a digital media item to create recognized patterns. A digital media item may be a video clip (e.g., YouTube video clip), a broadcast media item (e.g., via cable), an Internet streaming media item (e.g., a television show or movie), or an image, among other media items. In aspects, pattern recognizer 204 may have access to data collected by data collection engine 202. Pattern recognizer 204 may perform one or more processing operations on the collected data. The processing operations may include identifying a set of features and/or objects of the collected data, organizing the identified features and/or objects into one or more groups (such as feature and/or object vectors), and sorting the data according to one or more criteria (e.g., audio and/or visual attributes). The processing operations may additionally include separating audio features from visual features and vice versa. Audio features that may be identified and extracted by pattern recognizer 204 include but are not limited to the timbre, pitch, intonation, intensity, and volume of the audio. Pattern recognizer 204 may utilize waveplots, spectrograms, log power spectrograms, and other methods to identify and extract various audio features. For example, the amplitude of a person speaking may be more variable in a waveplot as compared to the amplitude of background music.

In aspects, pattern recognizer 204 may also be configured to extract and identify visual features and objects from the collected data received from data collection engine 202. For example, pattern recognizer 204 may utilize pixel recognition algorithms, object extraction techniques, and convolutional neural networks to identify and extract visual features and objects. In one aspect, pattern recognizer 204 may extract human objects from a graphical image, where the human object data may comprise the shape and outlines of the human objects and/or facial features, among other visual data. In another aspect, pattern recognizer 204 may identify and extract color schemes and environment layouts from the collected data of data collection engine 202. In at least one example, the identified and extracted multimedia features may be accessible to data collection engine 202 during the data collection process described above. In yet further examples, the pattern recognizer 204 may be configured to aggregate the extracted features into a feature vector that defines an established pattern. For example, pattern recognizer 204 may extract ten features from an older television episode. Five of those features may be audio features, such as a theme song and/or the tonality of the voice of a main character. The remaining five features may be visual features, such as object placement and/or garment and environment color schemes. The combination of the ten features may be used to construct a feature vector that defines a recognized pattern. The recognized pattern may then be used to train a machine learning model that will be compared against newer episodes of the television show. The comparison results may determine whether or not the newer episodes are pirated episodes.

In aspects, pattern recognizer 204 may include at least a training mode and a processing mode. During the training mode, pattern recognizer 204 may use a set of identified multimedia features to train one or more ML models associated with pattern recognizer 204. After an ML model have been trained, pattern recognizer 204 may enter processing mode, where input data is compared against the trained ML model. Based on the comparison, pattern recognizer 204 may produce a confidence score for the input data. The confidence score may indicate a similarity between the features/patterns of the input data and the multimedia features used to train the ML model. Alternately, or additionally, the confidence score may indicate a probability that the input data is pirated digital content.

In some aspects, pattern recognizer 204 may be configured with at least one machine learning model. A set of multimedia features may be used to train the machine learning model in pattern recognizer 204 during training mode. The set of identified multimedia features may be associated with specific multimedia identifiers, such as television show, movie, music, and other multimedia titles. Pattern recognizer 204 may utilize various machine learning algorithms to train the machine learning model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. The aforementioned machine learning algorithms may also be applied when comparing input data to an already-trained machine learning model. Based on the identified and extracted multimedia features and patterns, pattern recognizer 204 may select the appropriate machine learning algorithm to apply to the multimedia features to train the at least one machine learning model. For example, if the received multimedia features are complex and demonstrate non-linear relationships, then pattern recognizer 204 may select a bagging and random forest algorithm to train the machine learning model. However, if the multimedia features demonstrate a linear relationship to certain multimedia assets, then pattern recognizer 204 may apply a linear or logistic regression algorithm to train the machine learning model.

In other aspects, pattern recognizer 204 may apply at least one already-trained machine learning model to the received multimedia features and patterns to detect previously identified and extracted multimedia features and previously recognized patterns. Pattern recognizer 204 may be configured to compare at least one trained machine learning model to the multimedia features to generate comparison results that indicate whether the multimedia features are pirated digital content. Specifically, pattern recognizer 204 may compare the identified and extracted audiovisual features of the digital media item to at least one model trained on previously received multimedia features that are associated with specific multimedia identifiers. Pattern recognizer 204 is also configured to generate comparison results, indicating the similarity (or lack thereof) between certain multimedia assets on which the machine learning model was trained and the multimedia features. In other aspects, the comparison results may include a data object confidence indicator that a certain data object is present in the input data. For instance, the comparison results may generate a data object confidence indicator that a specific actor, object, theme song, etc. is present in the multimedia features and/or patterns. The comparison results may include data object confidence indicator information regarding identified data objects in the received multimedia features and/or patterns. The data object confidence information may then be used in determining the overall confidence value.

In other embodiments, input processing system 200 may be designed in a multi-state configuration and include more than one machine learning model and/or algorithm. In such embodiments, a first machine learning model may be trained to recognize one type of media entity (e.g., character feature, theme song, setting, backdrop, character voice, etc.), and a second machine learning model may be trained to recognize another type of media entity. For example, one machine learning model may be trained on specific types of character features (e.g., clothing), and another machine learning model may be trained on specific types of music (e.g., opening theme song). In other aspects, multiple machine learning models may be distributed within the input processing system 200. A multi-state configuration allows for multiple machine learning models to process data simultaneously, thereby increasing processing power and speed, which may translate to more accurate piracy determinations of the input data. The comparison results generated by each machine learning model in a multi-state configuration may be aggregated prior to transmitting to the probability engine 206.

Probability engine 206 may be configured to receive and process the comparison results generated by pattern recognizer 204. In aspects, probability engine 206 may utilize one or more rule sets comprising criteria for evaluating the comparison results. The rule sets may comprise one or more rules, predicates, actions, and/or threshold values. The rules may be generated by statically by one or more users, or dynamically by one or more components of input processing system 200. For instance, probability engine 206 may dynamically generate (or retrieve) a set of rules based on attributes of the digital media item (e.g., media item name, type, size, create date, author, distribution channel, etc.). In a particular example, probability engine 206 may use a rule set comprising a static rule for evaluating processing results and at least one confidence threshold that must be met (or exceeded) to perform an action associated with the rule. The confidence threshold may be a predetermined threshold that is defined/set manually. In aspects, the confidence threshold may be a value representing a number of identified features of a multimedia item. For example, if the confidence threshold is set at "10 features," identifying a combination of five audio and five visual features and/or objects from a recognized pattern may breach the confidence threshold. In other examples, probability engine 206 may classify the comparison results from pattern recognizer 204 as a certain confidence value, range of values, or label. For example, the confidence value may be in the form of a percentage indicating the confidence (e.g., 70% confidence value) that the received digital media item is a match to a digital media item (e.g., television show) stored in the database. The classified confidence value may be compared against a confidence threshold. Based on the comparison, probability engine 206 may determine whether the confidence value exceeds the confidence threshold. If the confidence value is equal to or exceeds the confidence threshold, probability engine 206 may classify the received input data from data collection engine 202 as pirated digital content. If the confidence value is less than the confidence threshold, then the probability engine 206 may classify the input data as non-pirated digital media.

Action response engine 208 may be configured to receive classification results from probability engine 206 and may also be configured to deploy an action response based on the classification results received from probability engine 206. Action response engine 208 may be configured to deploy remedial action in the event that input data is classified as pirated digital media. Remedial actions may include but are not limited to stopping the playback of the digital media on a client device, transmitting a warning to the client device screen, transmitting a warning to the content delivery network (CDN), transmitting a violation notice to a legal team to prompt the legal team to take action, and/or transmitting a warning to the network provider of the client device, among other remedial actions. In some aspects, action response engine 208 may be configured to deploy action responses regardless of client device type or streaming media type. In other aspects, action response engine 208 may employ machine learning techniques to determine the most appropriate action response based on previously applied action responses and the results following the application of the action responses. For example, some action responses may be more successful in thwarting digital pirated media on certain device platforms than other action responses. Based on the historical data of success rates of applied action responses and other collected information (e.g., device identifiers, operating system, browser type, etc.), a machine learning model may be trained to learn which types of action responses are most successful in remediating pirated digital media. In at least one example, action response engine 208 is configured to record and store action responses and receive data related to the results of applying the action response(s).

Figure 3:
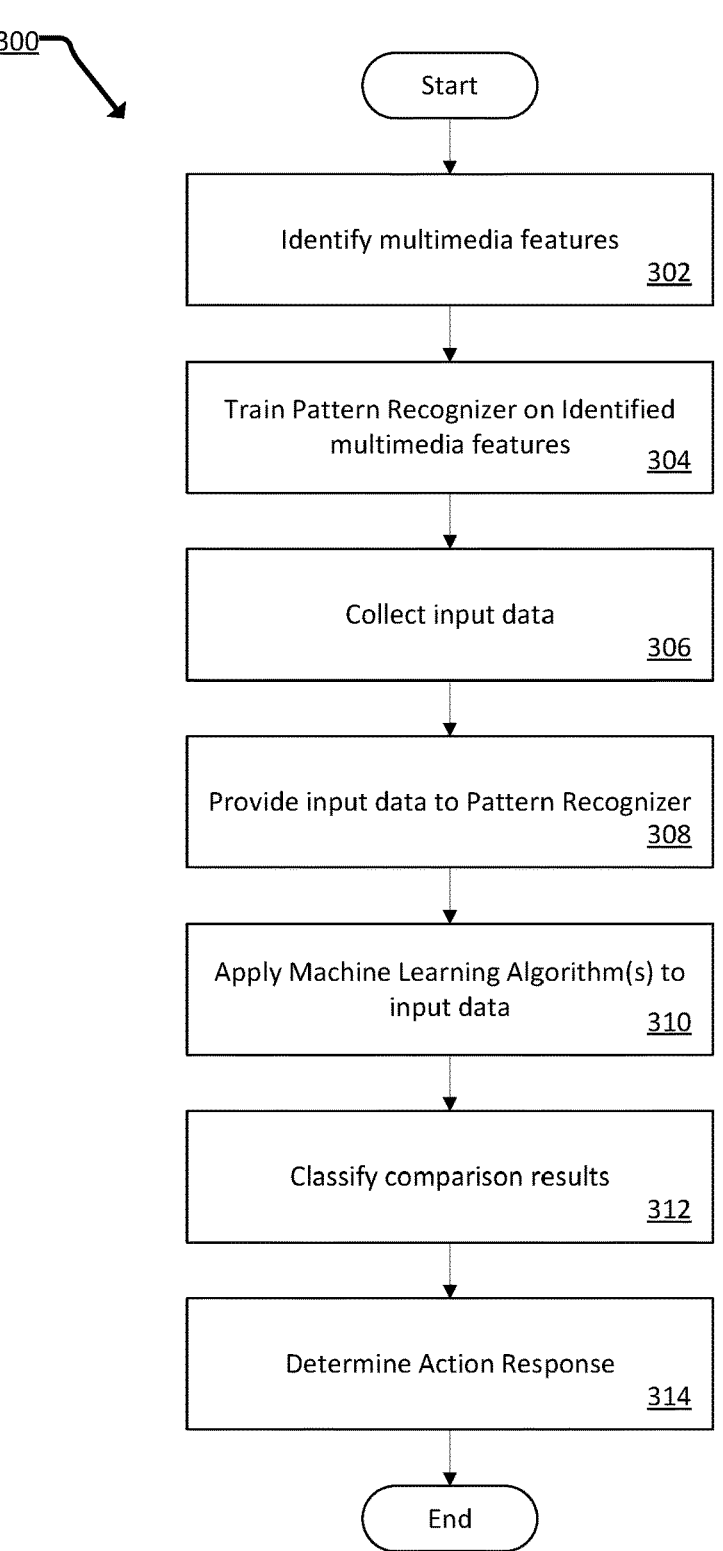
FIG. 3 illustrates an example method for detecting and remediating digital piracy, as described herein.

FIG. 3 illustrates an example method for detecting and remediating digital piracy, as described herein. In aspects method 300 may be executed by various systems, such as system 200 of FIG. 2 and may be executed on one or more devices comprising at least one processor configured to store and execute operations, programs, and/or instructions. However, method 300 is not limited to such examples. In other examples, method 300 may be performed by an application or service for detecting and remediating digital piracy. In at least one aspect, method 300 may be executed (e.g., computer-implemented operations) by one or more components of a distributed network, such as a web service or a distributed network service (e.g., cloud service).

Method 300 begins at operation 302 where multimedia features associated with input data may be identified and extracted. Multimedia features may include but are not limited to audio features and visual features. Audio features include but are not limited to timbre, pitch, intonation, intensity, and volume. In some example aspects, audio features may also include word recognition. For example, if a certain phrase is frequently spoken by an actor in a popular television show, the words and syntax of the phrase may be identified and extracted. The words and syntax may be identified and extracted using, for example, natural language processing techniques. Visual features may include but are not limited to pixel volume, pixel placement, color scheme, environment layout, shape outlines, and object placement, among other visual features. The multimedia features identified and extracted at operation 302 may be associated with specific multimedia titles and assets. Multimedia titles may include titles of television shows, movies, songs, albums, etc. Multimedia assets may include but are not limited to actor and actress names, producers, production companies, film companies, character names, character voices, etc.

At operation 304, at least one pattern recognizer, such as pattern recognizer 204, may be trained on identified and extracted multimedia features from operation 302. The pattern recognizer may include at least one trained machine learning model. The machine learning model(s) within the pattern recognizer may be trained on the multimedia features using a variety of machine learning algorithms, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. Targets (or target attributes) may be mapped to the multimedia features. For example, a certain audio feature (e.g., catch phrase of a famous character in a popular television show) may be associated with a popular television TV show. In other words, the certain audio features are mapped to the "target" television show. The machine learning model(s) is trained on this mapping of multimedia features to multimedia assets to find and establish patterns and/or confirm the frequency of recognized patterns established by pattern recognizer 204. The machine learning model, once trained, will be able to identify future patterns in input data based on the previously mapped multimedia features and previously recognized patterns.

At operation 306, input data is collected. Input data may include but is not limited to device type, device configuration information, browser type, streaming media information, multimedia features, GPS data, and other information associated with the device and streaming media items. In at least one aspect, input data may comprise a candidate multimedia object. The candidate multimedia object may be a multimedia object delivered via a live broadcast to a television or via an online streaming service over the Internet. For example, a candidate multimedia object may be a popular television show that is streamed in a web browser on the Internet.

At operation 308, the input data is passed to the pattern recognizer (such as pattern recognizer 204), where the multimedia features of the input data are identified and extracted and grouped together to form patterns. The multimedia features may include but are not limited to audio features and visual features. The processing operations may include organizing the collected data into one or more groups and/or sorting the data according to one or more criteria in order to create and identify recognized patterns. The processing operations may additionally include separating audio features from visual features. Further description of the multimedia features are described with respect to the pattern recognizer 204 from FIG. 2

At operation 310, the processed input data is provided to at least one machine learning model associated with the pattern recognizer. The trained machine learning model receives and evaluates the processed input data, which may include features vectors representing recognized patterns appearing in various multimedia items. Comparison results may be generated by the trained machine learning model. As a specific example, the machine learning model may compare the identified and extracted multimedia features of the received input data to at least one model trained on previously received multimedia features and target attributes that are associated with specific multimedia identifiers. The comparison results generated by the pattern recognizer may be used to predict whether the input data is pirated digital media. In some aspects, the comparison results may include a media item confidence indicator (e.g., 70% confidence that the media item is associated with a television show stored in the database) as to whether a certain media item is present in the processed input data. For example, the comparison results may include information indicating how confident the model is that one or more particular actors, objects, theme songs, etc. are present in the processed input data. In another aspect, the comparison results may include information indicating how confident the model is that one or more recognized patterns appear in the processed input data. The media item confidence results may be relied upon in determining the overall confidence value.

At operation 312, the comparison results generated at operation 310 may be classified as pirated digital media. In aspects, the comparison results from operation 310 may be converted into a confidence value by aggregating the comparison results (e.g., pixel matches, character recognition, theme song recognition, etc.) and distilling those comparison results into a value (e.g., a percentage, a label, etc.). The confidence value may be represented by a numeric value, e.g., on a scale from 1 to 10, with "1" representing a low confidence of piracy and "10" representing a high confidence of piracy. If a certain volume of multimedia features from the input data is found to be similar to previously processed multimedia based on the machine learning model, a higher confidence score may be generated. For example, if a confidence threshold is set at "10 features," identifying a combination of eight audio and/or visual features from a recognized pattern may produce a confidence value of 80% (e.g., 10% assigned for each of the eight identified features). The confidence value may be compared to a confidence threshold. In some aspects, the confidence threshold may be a fixed threshold. If the confidence value equals or exceeds the confidence threshold value, the input data may be classified as pirated digital media. For example, if the confidence threshold is set at "7" and the confidence value is "8," input data may be classified as pirated digital media. If the confidence value is less than the confidence threshold value, the input data may be classified as non-pirated digital media.

At operation 314, an action response is determined based on the classification of the input data. In aspects, when pirated digital media is detected at operation 312, an action response may be determined and/or executed. For example, in response to detecting pirated digital media, a signal transmission to stop the playback of the multimedia on a particular device may be generated. In another example, a warning pop-up message may be generated and displayed on a particular device. The warning pop-up message may notify the user that pirated digital media is being viewed, and request the user to cease playback immediately. In yet another example, an action response may comprise notifying the network provider of a particular device that is viewing pirated digital media. In still yet another example, the action response may be a warning message transmitted to a content delivery network (CDN) that is streaming a digital media asset without authorization. In yet another example, a violation notice may be transmitted to a designated legal team, prompting the legal team to take legal action against the owner of the device streaming the pirated content. In aspects, if the classification from operation 312 indicates that the input data is not pirated digital media, it may be determined that no action response is needed.

Figure 4:
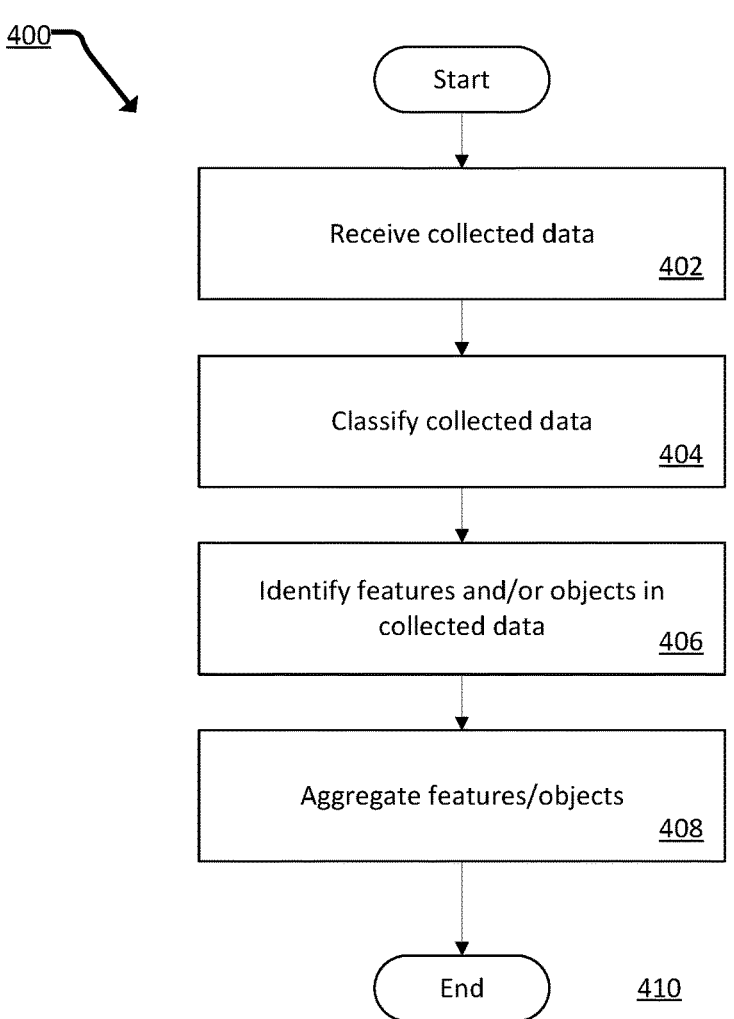
FIG. 4 illustrates an example method for recognizing patterns in multimedia items.

FIG. 4 illustrates an example method for recognizing patterns in multimedia items, as described herein. In aspects, method 400 may be executed by various systems, such as system 200 of FIG. 2, and may be executed on one or more devices comprising at least one processor configured to store and execute operations, programs, and/or instructions. Specifically, method 400 may be executed by a pattern recognizer (such as pattern recognizer 204). However, method 400 is not limited to such examples.

Method 400 begins at operation 402 where input data collected by a data collection engine (such as data collection engine 202) is received by a pattern recognizer (such as pattern recognizer 204). The collected data may comprise various multimedia features. Multimedia features may include, but are not limited to, audio features and visual features. Audio features include, but are not limited to, timbre, pitch, intonation, intensity, and volume. In some example aspects, audio features may also include word recognition. For example, if a certain phrase is frequently spoken by an actor in a popular television show, the words and syntax of the phrase may be identified and extracted. The words and syntax may be identified and extracted using, for example, natural language processing techniques. Visual features may include, but are not limited to, pixel volume, pixel placement, color scheme, environment layout, shape outlines, and object placement, among other visual features.

At operation 404, the collected data is classified into groups. For example, the collected data may be classified according to type of feature (e.g., audio, visual, unknown, etc.). At operation 406, certain features and/or objects of the separated data may be identified. For example, a certain audio feature may be identified as a theme song or a catch-phrase by a main character. A certain visual feature may be identified as a particular sofa or a city backdrop.

At operation 408, the identified features and objects may be aggregated to establish a pattern. For example, a certain audio feature and a certain visual feature may frequently be identified in the same scene. Because the audio feature and visual feature are identified together frequently, they may be aggregated to form part of a pattern. As more features and objects are identified in the collected data, more established patterns may be recognized. In some aspects, a pattern may comprise only a few multimedia features and/or objects. In other aspects, a pattern may comprise many multimedia features and/or objects.

Figure 5:
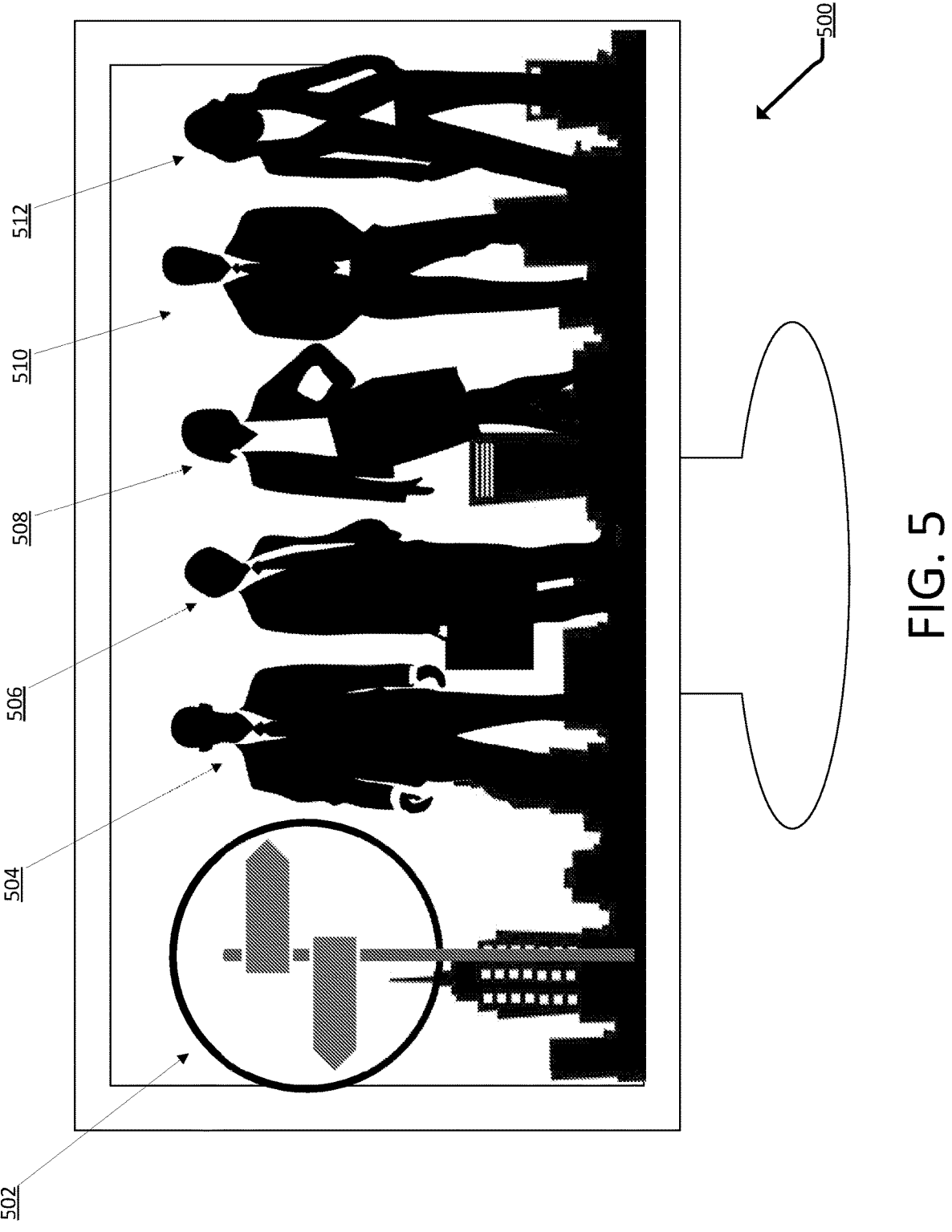
FIG. 5 illustrates an example of a digital media item.

FIG. 5 illustrates an example of a digital media item. Digital media item 500 is comprised of various multimedia features, including but not limited to street sign 502, character 504, character 506, character 508, character 510, and character 512, among other multimedia features. Digital media item 500 may represent an episode of a popular television show. The popular television show may include frequently used multimedia features, such as a theme song, catchphrases, character outfits, city backdrops, and the like. In one aspect, street sign 502 may comprise a specific visual multimedia feature. The color scheme, location, and substance of street sign 502 may be associated with the popular television show represented by digital media item 500. Characters 504, 506, 508, 510, and 512 may also include data attributes such as color scheme, articles of clothing, shape outlines, and order of objects, among other data attributes. For instance, digital item 500 may represent a frequently displayed introductory screen of a popular television show. The order of the characters 504, 506, 508, 510, and 512 from left to right may be a visual multimedia feature (e.g., order of objects) that is mapped to the popular television show. In another example, the particular briefcase of character 506 and the particular outfit of character 508 may be visual multimedia features that are mapped to the popular television show. In yet another example, facial features of characters 502, 504, 506, 508, 510, and 512 may be identified and extracted as multimedia features. The facial features may be used to identify the popular television show represented in digital media item 500.

In aspects, if digital media item 500 was received by the digital piracy detection and remediation system described herein, digital media item 500 may be processed by pattern recognizer 204 at operation 308. Pattern recognizer 204 may identify and extract particular multimedia features and recognize certain patterns, such as a particular theme song or visual features or a combination of audio/visual features that comprise a recognized pattern, such as the combination of street sign 502 and characters 504, 506, 508, 510, and 512. The multimedia features may be provided to a trained machine learning model associated with pattern recognizer 204. The trained machine learning model may have been trained on previous episodes and multimedia features from the popular television show depicted in digital media item 500. The comparison results between the machine learning model and the multimedia features of digital media item 500 may be converted into a confidence value that is compared to a confidence threshold to determine if digital media item 500 is pirated digital media content. For example, street sign 502 may be allocated a value of 0.1 and each of characters 504, 506, 508, 510, and 512 may be allocated a value of 0.2. If each of the five characters 504, 506, 508, 510, and 512 and street sign 502 are observed in the same frame of a digital media item, the values may be added together to equal 1.1 (e.g., 0.1+0.2+0.2+0.2=0.2). The sum value 1.1 may be compared to a threshold value (e.g., 0.7) to determine if the digital media item is more or less likely to be pirated content. In one aspect, if street sign 502 was the only multimedia feature identified and extracted from digital media item 500, the confidence value generated may be less than the confidence threshold. Accordingly, digital media item 500 may be determined to be non-pirated digital media. For example, street sign 502 may be allocated a value of 0.1. If street sign 502 is the only digital media asset observed in a frame, the value of 0.1 may be compared against a threshold value (e.g., 0.7). Because 0.1 is less than the threshold value, digital media item 500 may not be flagged as pirated content. However, if a particular pattern of multimedia features and objects (e.g., street sign 502 in combination with a theme song and characters 504, 506, 508, 510, and 512) was identified, the comparison results may lead to a confidence value that may exceed the confidence threshold. Accordingly, digital media item 500 may be determined to be pirated digital media.

Figure 6:
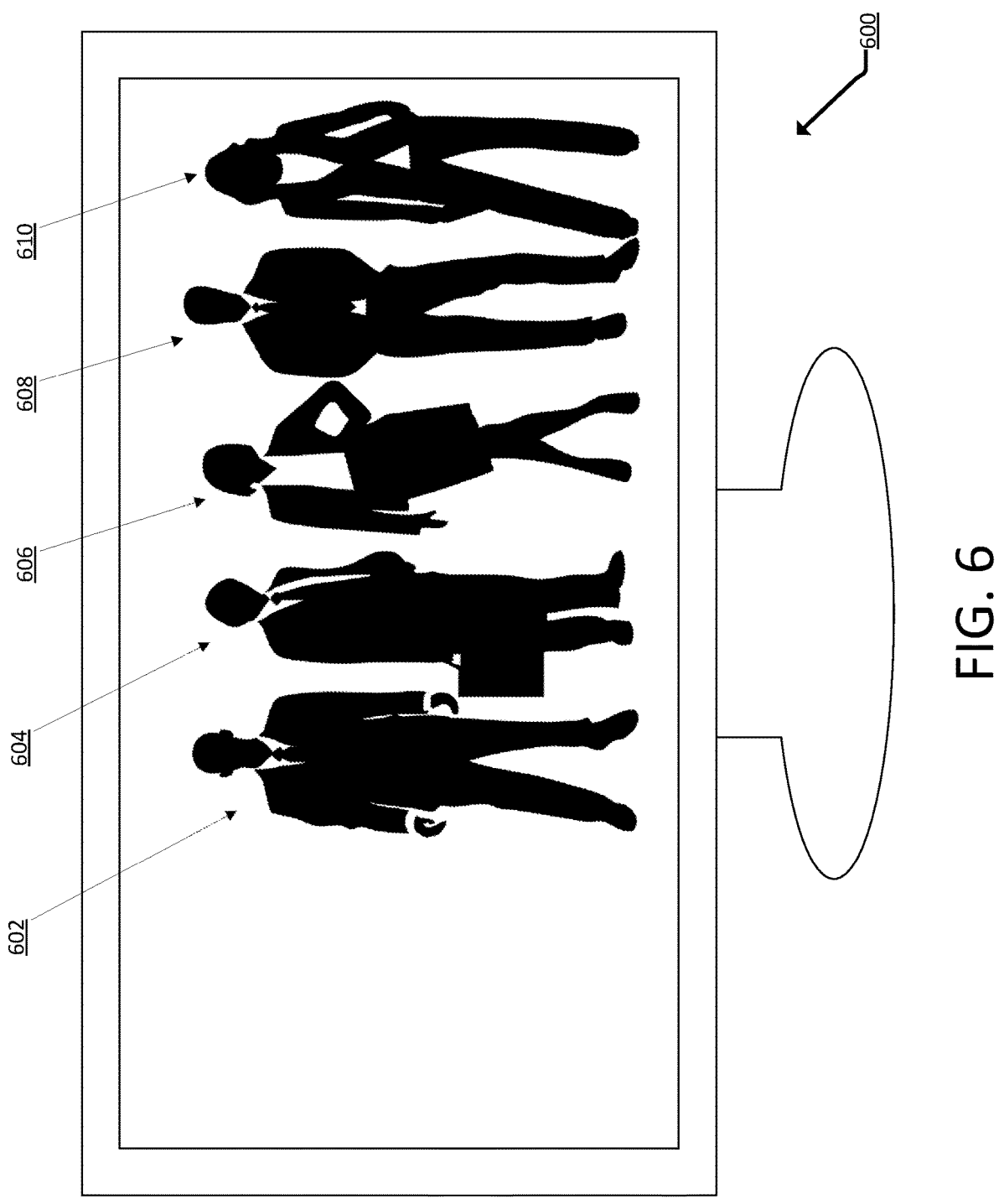
FIG. 6 illustrates an example of extracted multimedia features of a digital media item.

FIG. 6 illustrates an example of extracted multimedia features of a digital media item. In one aspect, the multimedia features that may be extracted from digital media item 600 are character outlines 602, 604, 606, 608, and 610. The particular shapes of the character outlines 602, 604, 606, 608, and 610 may be multimedia features used to train a machine learning model to identify pirated digital media. In other aspects, character outlines 602, 604, 606, 608, and 610 may be newly received input data that is compared against an already-trained machine learning model. For example, digital media item 500 from FIG. 5 may have been used as training data for a machine learning model. Digital media item 600 may represent incoming data. Based on the comparison of the multimedia features (e.g., character outlines 602, 604, 606, 608, and 610) of digital media item 600 to a trained machine learning model that was trained on digital media item 500, a confidence value may be generated that indicates a similarity between digital media items 500 and 600. For example, the machine learning model may generate comparison results indicating the similarities between the shapes of the characters 602, 604, 606, 608, and 610 and the shapes of characters 504, 506, 508, 510, and 512. The confidence value in this example may exceed a confidence threshold, which may result in digital media item 600 being classified as pirated digital media.

Figure 7:
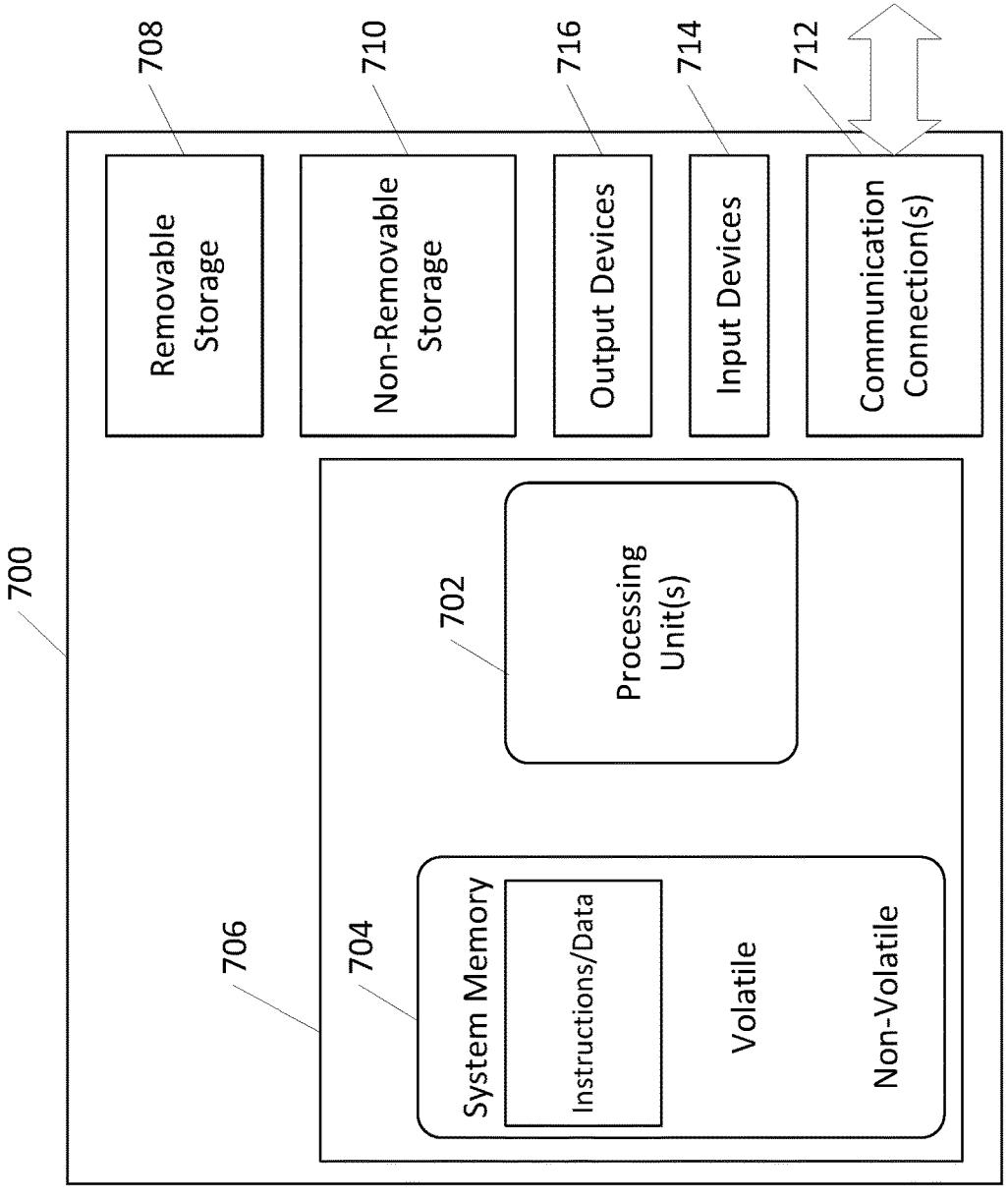
FIG. 7 illustrates one example of a suitable operating environment in which one or more of the present embodiments may be implemented.

FIG. 7 illustrates one example of a suitable operating environment 700 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections, 712, such as LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory coupled to the at least one processor, the memory comprising computer executable instructions that, when executed by the at least one processor, performs a method comprising:
      collecting data associated with a first digital media item;
      extracting a set of multimedia features from the data associated with the first digital media item;
      selecting at least one machine learning model from a plurality of models based upon one or more characteristics of the set of multimedia features, wherein the one or more characteristics of the set of multimedia features are content characteristics of the first digital media item;
      evaluating, in real-time during streaming of the first digital media item, the set of multimedia features using the at least one machine learning model;
      generating a confidence value based on the evaluation of the set of multimedia features, wherein the confidence value indicates a degree of similarity between the first digital media item and a second digital media item;
      comparing the confidence value to a confidence threshold; and
      when the confidence value exceeds the confidence threshold, classifying the first digital media item as pirated content.

2. The system of claim 1, wherein the first digital media item is at least one of: a video clip, a broadcast media item, an Internet streaming media item, and an image.

3. The system of claim 1, wherein the multimedia feature is at least one of: an audio feature and a visual feature.

4. The system of claim 3, wherein the audio feature is at least one of: timbre, pitch, intonation, intensity, and volume.

5. The system of claim 3, wherein the visual feature is at least one of: an object, a pixel volume, a pixel placement, a color scheme, an environment layout, a shape outline, and an object placement.

6. The system of claim 1, wherein evaluating the set of multimedia features comprises comparing the set of multimedia features to the at least one machine learning model using at least one of: a linear regression, a logistic regression, a linear discriminant analysis, a regression tree, a naive Bayes algorithm, a k-nearest neighbors algorithm, a learning vector quantization, a neural network, a support vector machines (SVM), and a random forest.

7. The system of claim 1, the method further comprising:
      determining at least one action response, wherein the action response is associated with preventing piracy of the multimedia item.

8. The system of claim 7, wherein the at least one action response comprises at least one of: transmitting a violation notice to a legal team, stopping playback of the first digital media item, transmitting a warning to a client device, transmitting a warning to a content delivery network, and transmitting a warning to a network provider.

9. The system of claim 1, wherein the confidence threshold is a value set by a machine learning algorithm.

10. The system of claim 1, wherein collecting data associated with a first digital media item further comprises employing at least one web crawler.

11. The system of claim 1, wherein generating the confidence value comprises generating a respective confidence value for each multimedia feature in the set of multimedia features, and summing the respective confidence values to generate the confidence value.

12. A method comprising:
      collecting data associated with a first digital media item;
      extracting at least one multimedia feature from the first digital media item;
      training at least one machine learning model(s) on the at least one multimedia feature from the first digital media item;
      collecting data associated with a second digital media item;
      selecting a machine learning model from the at least one machine learning model(s) based upon one or more characteristics of the data associated with the second digital media item, wherein the one or more characteristics of the data associated with the second digital media item are content characteristics of the second digital media item;
      determining, using the machine learning model in real-time during streaming of the first digital media item, that the second digital media item is similar to the first digital media item;

generating a confidence value, wherein the confidence value is equal to or greater than a confidence threshold; and classifying the second digital media item as pirated content.

13. The method of claim 12, wherein training at least one machine learning model on the at least one multimedia feature from the first digital media item comprises employing at least one of: a linear regression, a logistic regression, a linear discriminant analysis, a regression tree, a naïve Bayes algorithm, a k-nearest neighbors algorithm, a learning vector quantization, a neural network, a support vector machines (SVM), and a random forest.

14. The method of claim 12, wherein the first digital media item is at least one of: a video clip, a broadcast media item, an Internet streaming media item, and an image.

15. The method of claim 12, wherein the second digital media item is at least one of: a video clip, a broadcast media item, an Internet streaming media item, and an image.

16. The method of claim 12, wherein determining, based on the machine learning model, that the second digital media item is similar to the first digital media item further comprises detecting at least one audio feature similarity between the second digital media item and the first digital media item.

17. The method of claim 12, wherein determining, based on the machine learning model, that the second digital media item is similar to the first digital media item further comprises detecting at least one visual feature similarity between the second digital media item and the first digital media item.

18. The method of claim 12, further comprising deploying at least one action response.

19. The method of claim 18, wherein the at least one action response is at least one of:

stopping playback of the second digital media item, transmitting a warning to a client device that is playing the second digital media item, transmitting a warning to a content delivery network that delivered the second digital media item, and transmitting a warning to a network provider associated with the second digital media item.

20. A computer storage media storing computer executable instructions that when executed cause a computing system to perform a method comprising:

collecting data associated with a digital media item;

extracting a set of multimedia features from the digital media item;

selecting at least one machine learning model from a plurality of models based upon one or more characteristics of the set of multimedia features, wherein the one or more characteristics of the set of multimedia features are content characteristics of the digital media item;

evaluating, in real-time during streaming of the first digital media item, the set of multimedia features using the at least one machine learning model;

based on the evaluation, generating a confidence value for the digital media item, wherein the confidence value indicates a degree of similarity between the digital media item and a set of digital media item;

comparing the confidence value to a confidence threshold to classify the digital media item as at least one of pirated content and non-pirated content; and when the digital media item is classified as pirated content, deploying at least one action response.

* * * * *